United States Patent [19]

Struthers

[11] 4,317,863
[45] Mar. 2, 1982

[54] FUEL CELL

[75] Inventor: Ralph C. Struthers, Saugus, Calif.

[73] Assignee: Universal Fuel Systems, Inc., Saugus, Calif.

[21] Appl. No.: 155,962

[22] Filed: Jun. 3, 1980

[51] Int. Cl.³ .......................................... H01M 12/06
[52] U.S. Cl. ....................................... 429/19; 429/27
[58] Field of Search .................... 429/27, 28, 29, 34, 429/35, 36, 37, 17, 19, 70

[56] References Cited

U.S. PATENT DOCUMENTS

| 3,043,898 | 7/1962 | Miller et al. | 429/27 |
| 3,513,030 | 5/1970 | Rosansky et al. | 429/37 |
| 3,574,560 | 4/1971 | Sturm et al. | 429/17 |
| 3,682,706 | 8/1972 | Yardney et al. | 429/27 |
| 4,189,528 | 2/1980 | Klootwyk | 429/70 |

FOREIGN PATENT DOCUMENTS 1236872 6/1971 United Kingdom .................. 429/34

Primary Examiner—Donald L. Walton
Attorney, Agent, or Firm—Georges A. Maxwell

[57] ABSTRACT

A metal/air fuel cell comprising an elongate case with a closed inner space, a flat flexible diaphragm and a flat cathode plate with axially disposed inner opposing surfaces and outer surfaces and arranged in the case to define a central electrolyte chamber therebetween and air chambers axially outward thereof, a flat anode plate in the electrolyte chamber, a first collector between the anode and cathode plates and a flat electric insulating fluid permeable insulator between the cathode plate and the collector and cooperating therewith to maintain the plates in predetermined spaced relationship, electrolyte supply means conducting electrolyte into and out of the electrolyte chamber and air supply means conducting air under pressure into the air chambers to feed air into the outer surface of the cathode plate and to urge the diaphragm axially toward the anode plate anode thereby urging plate collector, insulator and cathode plate into uniform pressure engagement with each other.

6 Claims, 7 Drawing Figures

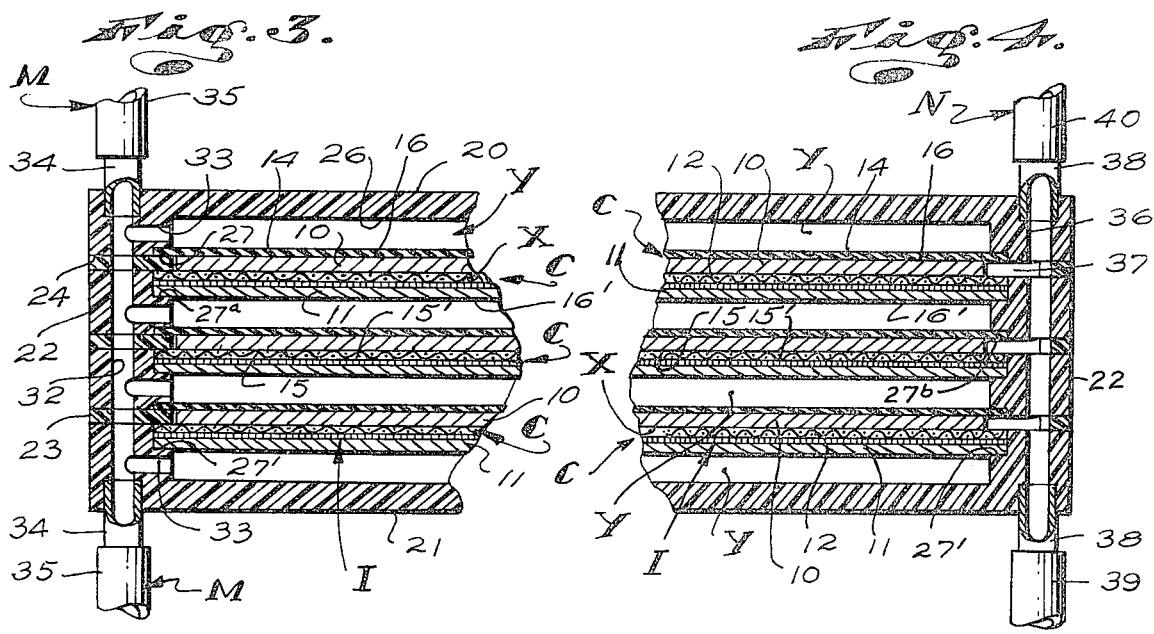
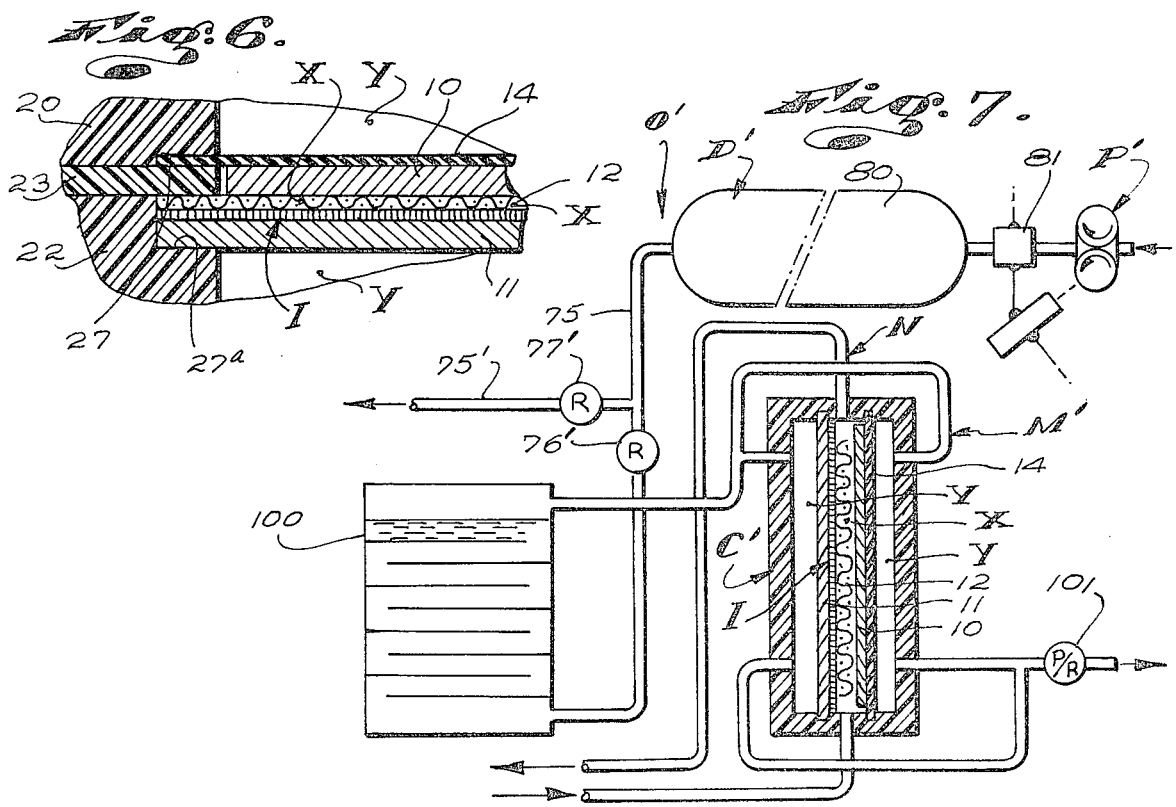

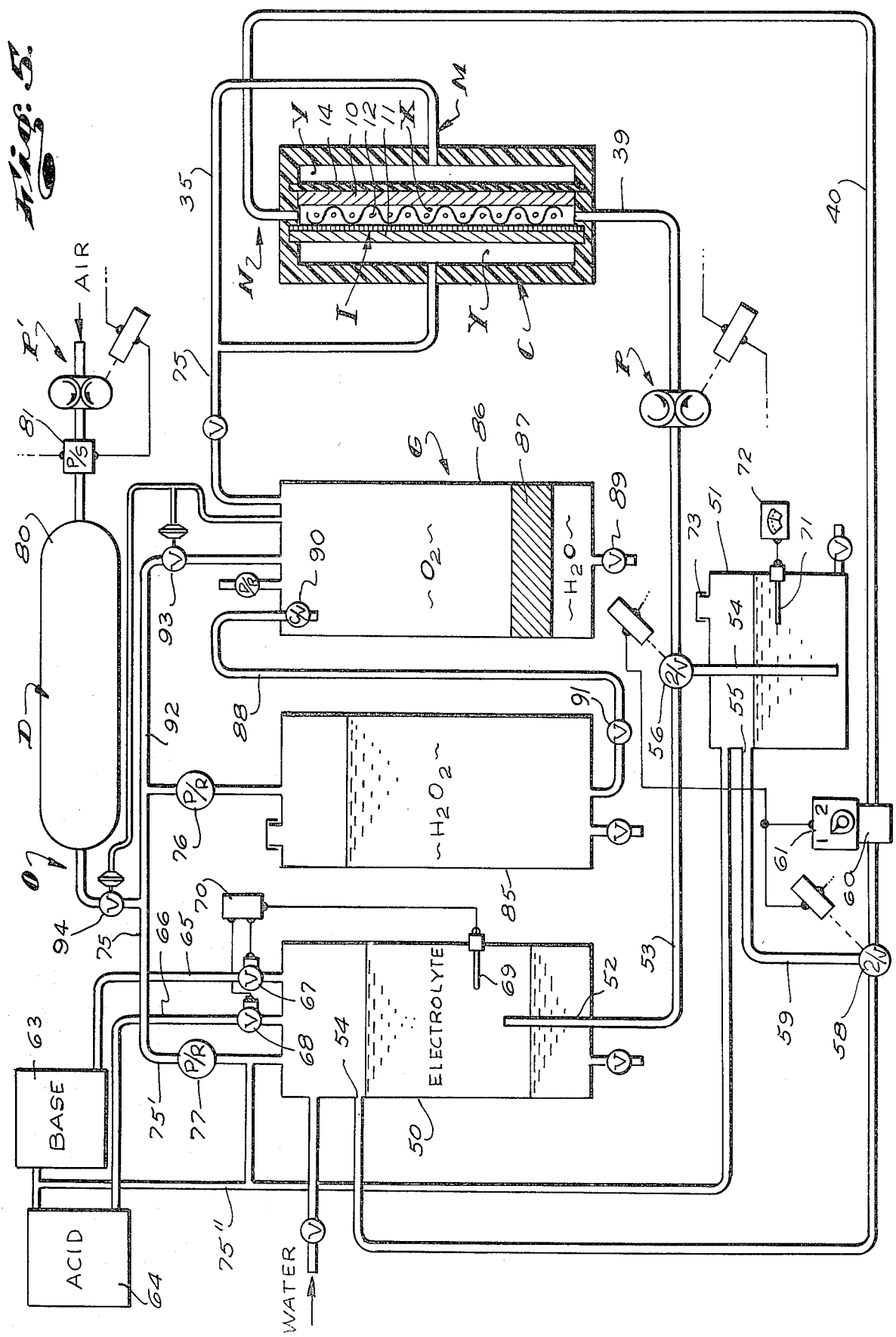

FUEL CELL

This invention has to do with fuel cells and is particularly concerned with a novel metal/air fuel cell structure and support system.

BACKGROUND OF THE INVENTION

Metal/air fuel cells of the character here concerned with are those electro-chemical devices including one or more pairs of spaced anode and cathode plates, an electrolyte between the plates, and air delivery means to deliver air to the cathode plate or plates. Such cells operate to convert free energy of the chemical reaction generated by and between the chemically reactive parts and/or material going to make up the cells, into electrical energy. In metal/air fuel cells of the character here concerned with, the anodes are generally and preferably established of a desired expendable metal fuel, such as aluminum, and the cathodes are generally and preferably established of a substantially chemically stable electric conductive, catalytic material, such as carbon or silver. The cathodes are preferably micro-porous structures into which air or oxygen can be effectively supplied for introduction into the chemical reaction as an oxidant.

In operation of ordinary metal/air fuel cells, oxygen from the air, or from an oxygen supply at the surfaces of the cathode plates, reacts with the electrons and water of the aqueous electrolyte to form hydroxyl ions. During this reaction, electrons are removed from the cathode plates resulting in a positive charge at the cathodes. The hydroxyl ions travel through the electrolyte from the cathodes to the anodes. When the hydroxyl ions meet the anodes, metal atoms of the anodes react therewith to form water and free electrons, which electrons are suitably collected and conducted from the cells as electric current.

Metal/air fuel cells of the character referred to above can be extremely effective and efficient generators of electric current when precise operating conditions are established and maintained, but are, as a general rule, subject to developing chemical instabilities which cannot be effectively controlled. Further, such cells generally deteriorate or expend themselves at an excessively rapid rate and are subject to a multiplicity of other shortcomings which, to date, have greatly reduced or prohibited their practical application and use.

One major shortcoming of metal/air fuel cells of the character here concerned with resides in the fact that the structures of such cells are most often such that when they are once assembled and put into service to generate electric current, they cannot be effectively turned off or put out of service and must be left to operate until their effective life is spent. That is, until the metallic fuel anodes are completely consumed.

Another common shortcoming in cells of the character here concerned with resides in the fact that when the metallic fuel anodes are consumed or spent, the whole of the cell structures are spent and must be reconstructed before they can be used again. That is, they are such that when the anode plates are consumed or spent, there is no practical way or means whereby those plates can be easily, effectively and quickly replaced without the undertaking of substantial, time-consuming and costly work which constitutes substantial rebuilding of cells.

Yet another common and serious shortcoming found in cells of the character here concerned with resides in the fact that as the anode plates are consumed, they become structurally unstable and tend to break apart and to drop in the cells to collect in such a manner that the material cannot be effectively utilized and in such a manner that the cells are shorted out or otherwise rendered useless.

OBJECTS AND FEATURES OF MY INVENTION

An object of my invention is to provide a novel metal/air fuel cell which is simple, practical and economical to make and to use.

Another object and feature of my invention is to provide a fuel cell or battery of fuel cells of the character referred to including a support system or means for effectively putting the cell or battery into and out of operation, as desired, and as circumstances require, whereby the useful service life of the cell or battery can be most effectively and efficiently utilized.

Yet another object and feature of my invention is to provide a fuel cell or battery of the character referred to which includes expendable metal fuel anode plates and means to support and maintain those plates in effective and efficient operating disposition within the cell structures until the metal of which they are established is substantially completely consumed.

Still another object and feature of my invention is to provide a novel fuel cell or battery of the character referred to above which is such that when the anode plates are spent or consumed, new anode plates can be easily and quickly installed in their place without replacement and/or rebuilding of the cells.

It is an object and feature of my invention to provide a cell or battery structure of the general character referred to in which air or oxygen, under pressure, is supplied to the cathode plates and is utilized to operate pneumatic or gas pressure actuated means to hold and maintain the anode plates in efficient operating position.

An object and feature of my invention is to provide a novel fuel cell or battery structure of the general character referred to above which includes novel electrolyte and air or oxygen supply means which are operable to selectively put the cell into and out of operation and to maintain the cell or battery in stable chemical balance when in operation.

Another object and feature of my invention is to provide a fuel cell structure or battery and related means of the general character referred to above which is particularly suited for utilizing aluminum and certain other inexpensive and abundant materials as the metallic fuel of which the anode plates are established.

The foregoing and other objects and features of my invention will be apparent and will be fully understood from the following detailed description of typical preferred forms and embodiments of my invention, throughout which description reference is made to the accompanying drawings.

DESCRIPTION OF THE DRAWINGS

FIG. 3 is an enlarged detailed sectional view taken substantially as indicated by line 3—3 on FIG. 1;

FIG. 4 is an enlarged detailed sectional view taken substantially as indicated by line 4—4 on FIG. 1;

FIG. 5 is a diagrammatic view showing a preferred cell support system and apparatus embodying my invention;

FIG. 6 is an enlarged sectional view of a portion of the cell; and

FIG. 7 is a diagrammatic view of another form of air supply means.

DETAILED DESCRIPTION OF THE INVENTION

Figure 1:
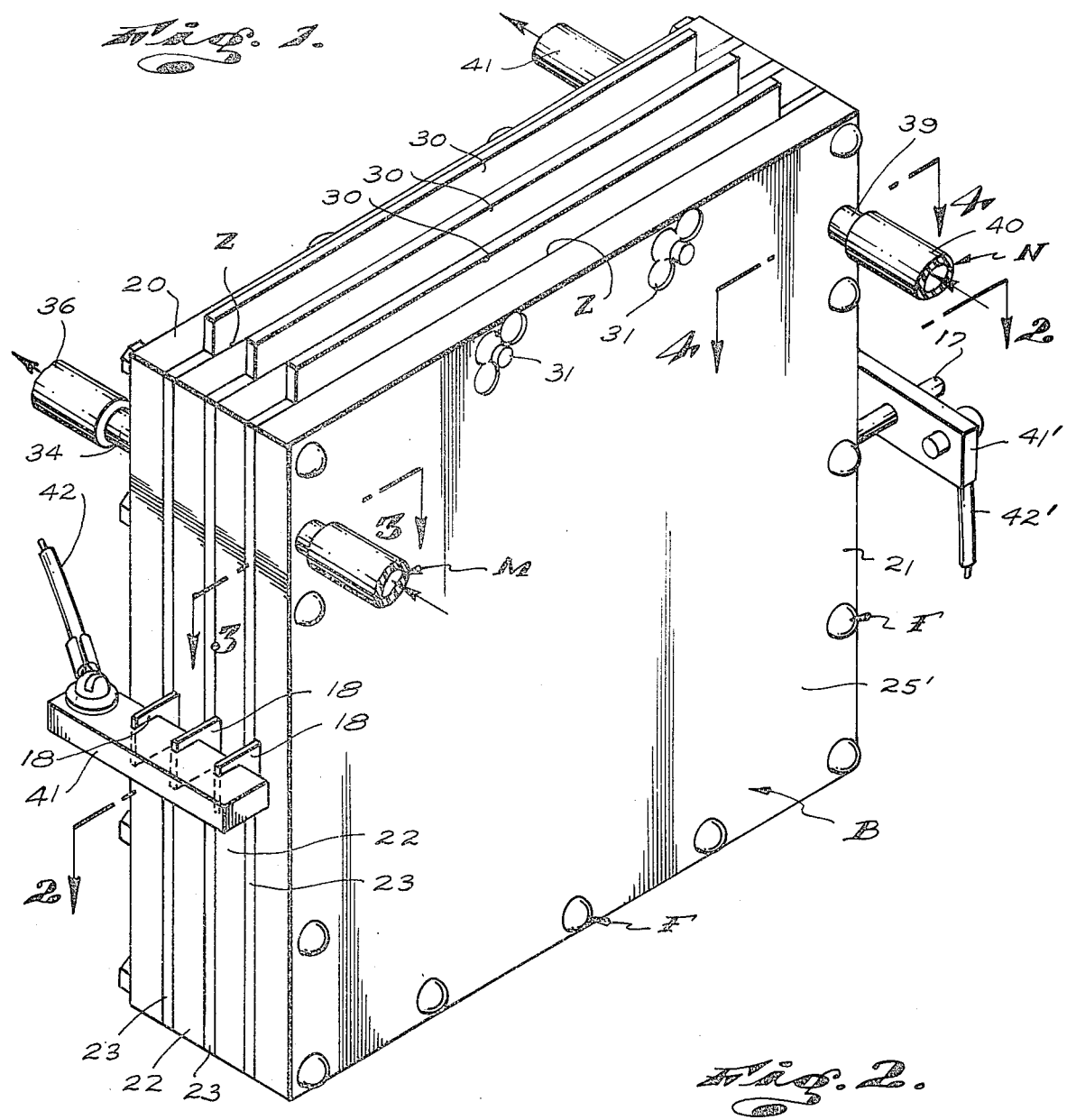
FIG. 1 is an isometric view of a battery of cells embodying my invention.
Figure 2:
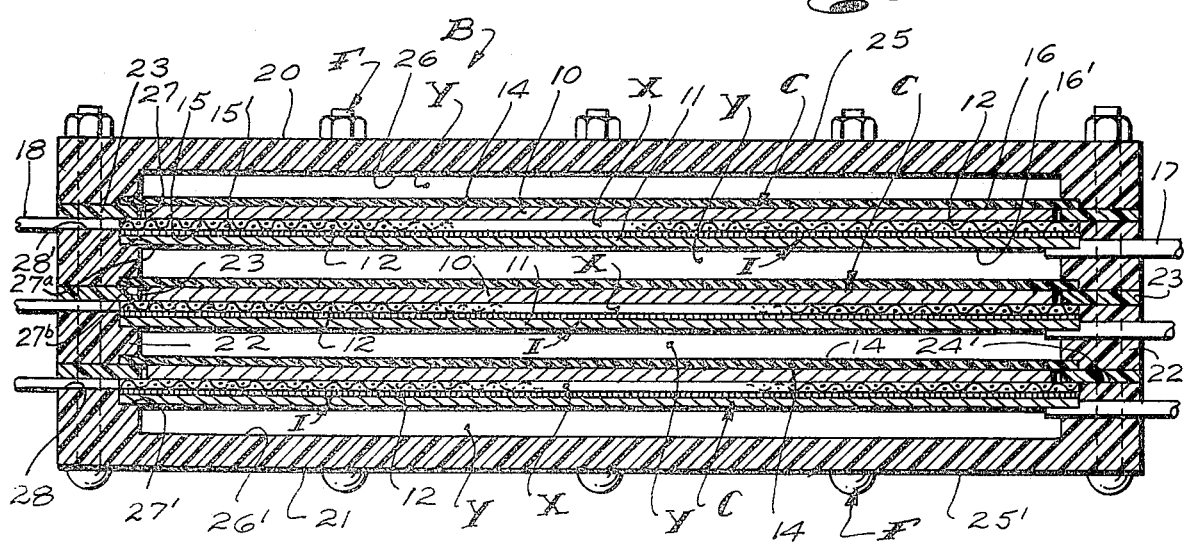
FIG. 2 is an enlarged detailed sectional view taken substantially as indicated by line 2—2 on FIG. 1.

Referring to FIGS. 1 through 4 of the drawings, I have illustrated a battery B including three like cells C. Each cell C includes an anode plate 10, a cathode plate 11, a collector 12 between the plates 10 and 11 an electric insulator I between the cathode plate and collector; and a diaphragm 14 adjacent the anode plate. The anode plates are thin, flat rectangular plates of suitable metallic fuel such as aluminum. The cathode plates are preferably microporous structures through which gas and liquids will not readily or freely flow but in and through which oxygen (under light pressure) can be fed to support the chemical reaction within the cell. The plates 10 and 11 have flat inner surfaces 15 and 15' and flat outer surfaces 16 and 16', respectively.

The plates 10 and 11 of each cell C are arranged with their inner surfaces 15 and 15' in predetermined spaced parallel and opposing relationship and with their outer surfaces 16 and 16' oppositely disposed. The spaced plates 10 and 11 cooperate with each other, and with other structure which will be later described, to define electrolyte chambers X.

The cathode plates 11 have outwardly projecting positive terminals 17 formed integrally therewith or suitably fixed thereto. In the form of the invention illustrated, the terminals 17 are separate parts with inner ends arranged to contact their related plates.

The collector 12 of each cell C can vary widely in form and construction. In the preferred form of the invention, the collectors 12 are flat, rectangular sheets of woven metal cloth and are coextensive with and arranged in the chambers X in supporting engagement with and between the inner surface 15' of their related plates 11 and the insulator I related thereto. The collectors 12 are made of chemically stable electric conductive metal, such as a stainless steel alloy and are such that they accommodate and allow for the free flow of an aqueous electrolyte solution into, through and out of the chambers X.

The collectors 12 have outwardly projecting negative terminals 18 suitably fixed thereto or formed integrally therewith. In the case illustrated, the terminals 18 are tabs integrally formed on or with the collectors.

The insulators I are thin flat sheets of fluid permeable electric insulating material such as sheets of perforated or reticulate Nylon or the like. The insulators are dimensionally stable in the environment and establish flat supported engagement with and between their adjacent surfaces of their related screens and anodes.

The diaphragms 14 in the cells C are thin, flat suitably flexible and/or elastic imperforate sheet-like parts of dielectric material, such as neoprene, polyvinylchloride or some other suitable, equivalent material. The diaphragms 14 are coextensive with the outer surfaces 16 of the anode plates 10.

In practice, and in furtherance of my invention, each cell includes air chambers Y outward of the diaphragms 14 and outward of the outer surfaces 16' of the cathode plates 11.

In practice, and in the preferred carrying out of my invention, adjacent cells C of the battery B are arranged in spaced relationship whereby the space between those cells define certain of the air chambers Y.

In furtherance of my invention and as clearly shown in the drawings, the plates 10 and 11, collectors 12 insulators I, and the diaphragms 14 are arranged within and carried by a sectional case including a pair of opposite square or rectangular end walls 20 and 21, two like intermediate square or rectangular open frames 22 and three like U-shaped spacers 23.

The end walls 20 and 21 have flat, inner and outer surfaces 24 and 25 and 24' and 25', respectively. The end walls 20 and 21 have square or rectangular inwardly opening cavities 26 and 26' at their inner surfaces 24 and 24' which cavities cooperate with related parts to define air chambers Y at the ends of the battery B.

The inner surface 24 of the end wall 20 has an inwardly opening recess 27 about the perimeter of the cavity 26 therein. The recess 27 receives the outer perimeter of the diaphragm 14 of the cell C related to that wall. The diaphragm 14 is in seated sealed engagement in the recess 27 and closes the chamber Y defined by the recess 26 related to it.

The inner surface 24' of the end wall 21 has an inwardly opening recess 27' about the perimeter of the cavity 26' therein. The recess 27' receives the outer perimeters of the cathode plate 11, the insulator I and of the collector 12 of the cell C related to that wall. The perimeter of the cathode plate is sealingly seated in the recess 27'. The cathode plate 11 related to the end wall effectively closes the chamber Y defined by the cavity 26' in that wall.

The wall 21 has a notch 28 entering its surface 24' at one side thereof and in and through which the terminal tab 18 of the collector 12 related thereto is sealingly engaged and from which the free end of the tab projects.

The three spacers 23 are thin, flat, U-shaped parts and correspond or are slightly greater in thickness and in inside dimension than the thickness and outside dimensions of the anode plates 10.

One spacer 23 is arranged adjacent the inside surface 24 of the end wall 20 to extend about and overlie three side portions of the inner surface 21 of that wall and the outer perimeter portion of the diaphragm 14 related to that wall, whereby the diaphragm is held captive and in tight sealing engagement between the wall 20 and the spacer.

Another spacer 23 is arranged adjacent the inside surface 24' of the end wall 21 to extend about and overlie three side portions of the inner surface 24' of that wall and the outer perimeter portions of the collector 12 related to that wall, whereby the collector insulator and their related cathode plate are held captive between the wall 21 and that spacer.

One rectangular or square frame 22 is arranged inward of the wall 20 and has a first flat surface which opposes and engages the spacer 23 related to or adjacent the wall 20. This frame 22 has an inner recess 27a entering its first flat surface and in which the outer perimeters of the cathode plate 11, insulator I and collector 12 of the cell C related to the wall 20 and which underlies the noted spacer 23, are seated. With this relationship of parts, the noted cathode plate 11, insulator I and collector 12 are held together and captive between the spacer and frame in predetermined uniform, spaced relationship from their related anode plate 10.

The above frame 22 next includes a notch 28' through which the terminal tab 18 of its related collector plate is engaged.

The above frame 22 next and finally has a second flat surface spaced from and disposed opposite from its noted first flat surface. A recess 27a enters the second surface to cooperatively receive the outer perimeter portion of the diaphragm 14 of another or next cell C in the same manner that the diaphragm 12 of the cell C related to the wall 20 is related with the recess 27 of that wall.

The third spacer 23 is related to and with the first noted frame 22 and with the diaphragm 14 related to it in the same manner that the spacer 23 related to the wall 20 is related to that wall and its related diaphragm.

The other or second frame 22 is related with the first noted frame member 22 and engages and holds its related diaphragm 14 and spacer of the cell C which is related to the wall 21 and the cathode plate 11 insulator I, collector 12 and the spacer 23 which are related to it, in the same manner that like and corresponding parts of the construction are engaged and held.

The wall 21 and the two frame members 22 are provided with terminal through openings in their sides opposite their sides in which the terminal tube receiving notches occur and through which the positive terminals 17 for the cathode plates 11 are sealingly engaged. The terminals 17 have inner ends against which their related plates 11 are clampingly engaged and have outer ends projecting freely from the case.

The several walls, frames and spacers 20, 21, 22 and 23 are engaged in longitudinal stacked relationship and are held in tight clamped and sealed relationship with each other and with the parts of the cells engaged therewith by a plurality of nut and bolt assemblies F or equivalent fastener means engaged through a plurality of sets of registering openings about three outer edge portions of the assembly, as clearly shown in the drawings.

Alternatively, the above stacked together parts can be integrally joined by a suitable current or might be molded as an integral unit.

The several spacers 23 are arranged with their open sides disposed toward the unfastened side of the assembly, whereby slot-like, laterally outwardly opening access openings Z are established to communicate with the spaces between the diaphragms 14 and the collectors 12 in the chambers X of the several cells and in which the anode plates 10 of those cells are arranged.

The access openings Z are normally plugged and closed by manually engageable flat bar-like closures 30 having portions slidably entered into the openings Z and normally retained in tight sealing engagement therein by manually operable releasable fastening means 31. The means 31 can, as shown, be bolt and wing-nut assemblies engaged through sets of registering openings in the assembly of related parts.

With the construction thus far described, it will be apparent that anode plates 10 of the cells C can be easily and quickly slid into engagement with and between their related diaphragms 14 and collectors 12, in the electrolyte chambers Y, through the opening Z by temporarily releasing the fastening means 31 and removing the closures 30.

It will be particularly noted that the diaphragm 14 and collectors 12 are securely held in the assembly so that displacement of those parts in a manner which might interfere with the insertion or engagement of anode plates therebetween, is not likely to occur.

In addition to the above, the cell or battery structure that I provide includes air supply means M to conduct air or oxygen into and out of the chambers Y and electrolyte supply means N to conduct electrolyte into and out of the chambers X.

Referring to FIGS. 1 and 3 of the drawings, the means M includes a set of registering through openings 32 extending through the assembly of walls, frames and spacers 20, 21, 22 and 23 at one side of the construction and laterally inwardly extending openings or ports 33 in the walls 20 and 21 and in the frames 22 communicating with the chambers Y and the openings 32. The openings 32 in the walls 20 and 21 are preferably provided with outwardly projecting nipples 34 with which air or oxygen conducting hoses or lines 35 are connected.

The means N includes a set of registering openings 36 extending through the assembly of walls, frames and spacers 20, 21, 22 and 23 at another side of the construction and notches or ports 37 in the spacers 23 extending between the chambers X and the openings 36 in the spacers. The means N next includes nipples 38 in and projecting outward from the openings 36 in the walls 20 and 21 and with which fluid or electrolyte conducting delivery and return lines 39 and 40 are connected.

With the means M noted above, and shown in the drawings, it will be apparent that air or oxygen can be introduced into and/or removed or exhausted from the chambers Y by any suitable air or oxygen supply means remote from the cell or battery structure. It will be further apparent that electrolyte can be introduced into, circulated through and/or displaced from within the chambers X by any suitable electrolyte supply means remote from the cell or battery structure.

In addition to the foregoing, the battery that I provide includes positive and negative buss bars 41 and 41' extending between and connected with the outer free ends of the terminals 17 and 18 of the several cathode plates 11 and collectors 12. The bars 41 and 41' are coupled with conductors 42 and 42' which can extend to and connect with means through which electric current generated by the battery is to be conducted.

In operation and use of the battery B that I provide, it is intended that when the battery is not in use and no electric current is required to be generated thereby, the battery is turned off or put in a non-operating mode by introducing and filling the chambers X with an electrolyte-like stand-by solution having a low PH which is such that little or no chemical reaction takes place in the cells C, no fuel is consumed, and no current is generated. When electric current is required, the stand-by solution is displaced or circulated out of the chambers X and is replaced by an electrolyte having that predetermined elevated or high PH, which is required to establish and maintain desired chemical reaction and the generating of electric current in the cells.

Further, in operation and use of the battery B that I provide, when the battery is in its current generating or operating mode, air or oxygen, under pressure, is introduced into the chambers Y to assure an adequate supply of air or oxygen to the cathode plates and so that the air or oxygen acts upon the diaphragms 14 of the construction to normally urge and maintain the anode plates in uniform supported engagement with and against their related collectors 12.

With the above relationship of parts, as the anode plates 10 are consumed and reduced in thickness, with corresponding reduction in their structural strength or integrity, they do not become detached or disconnected from the collectors, do not cause the space between the anodes and cathodes to increase or vary, and are supported and retained in such a manner that they are not likely or subject to disintegrating or falling apart in such a manner as to render the battery or the cells thereof inoperative, prior to substantial complete consumption of the fuel metal of which they are made.

To the above end, and in furtherance of my invention, reference is now made to FIG. 5 of the drawings wherein I have diagrammatically illustrated a typical preferred form of support system and/or apparatus for carrying out the desired and intended operation of my new cell or battery structure.

The system and apparatus shown in FIG. 5 of the drawings first includes an electrolyte handling means E. The means E includes an electrolyte supply tank 50 holding a supply of full strength electrolyte; a holding tank 51 holding a supply of stand-by solution; and electrolyte transfer means to selectively exchange the electrolyte in the chamber X of the cell C with the solution and vice-versa.

The tank 50 has an outlet 52 connected with the inlet side of a motor driven pump P by a line 53. The outlet of the pump P is connected with the delivery line 39 of the means N of the cell. The return line 40 of the means N extends from the cell and connects with an inlet 54 in the tank 50.

In practice, the tank 50 can, as shown, be constructed so that the hydroxides of the anode material carried from the cell by the electrolyte will settle and collect in the tank and the tank can be provided with a drain valve means to periodically drain the hydroxide therefrom.

With the foregoing structure, it will be apparent that the chamber X of the cell C can be effectively filled with electrolyte from the tank 50 and that the electrolyte can be effectively circulated through that chamber and back into the tank 50.

The tank 51 of the means E has a solution delivery or outlet duct 54 and an inlet opening 55.

The means E next includes a two-way valve 56 in the line 53 and connected with the duct 54 and a two-way valve 58 in the line 40 and connected with the inlet openings 55 by a line 59. The valves 56 and 57 are operable to shut off communication between the pump P and the tank 50 and open communication between the pump P and the tank 51 and to shut off communication of the line 40 with the tank 50 and establish communication between that line and the tank 51 whereby the stand-by solution in the tank 51 can be moved from that tank into the chamber X of the cell C and can be circulated through and from the chamber X, back into the tank 51.

With the structure and means set forth above, it will be apparent that by operating the valve 58 to shut off flow between the cell C and the tank 51 and establish flow between the cell C and the tank 50 and by operating the valve 56 to shut off flow to the tank 50 and establish flow to the tank 51, the stand-by solution can be moved from the tank 51 into the chamber X of the cell C to displace and move the electrolyte therein into the tank 50, when desired. Further, when desired and by operating the valve 56, to shut off flow to the tank 51 and establish flow to the tank 50 and by operating the valve 58 to shut off flow to the tank 50 and establish flow to the tank 51, electrolyte from the tank 50 can be circulated into the chamber X of the cell C to displace and move the stand-by solution therein back into the tank 51.

By transferring and exchanging the electrolyte and stand-by solution in the above manner, the cell can be effectively set in its operating and non-operating modes when and as circumstances require.

In furtherance of my invention, a PH detector 60 is engaged in the line 40 upstream of the valve 58. The valves 56 and 58 are electrically operated and are connected with and under control of an electric control device 61 connected with the detector 60 and which operates in response to the PH of the fluid in the line 40, upstream of the valve 58 and sensed by the detector 60.

The control device 61 is preferably such that it can be manually set to one or the other of two predetermined operating positions and to operate the valves 56 and 58 from one to the other of their two positions when the PH of the fluid in the line 40 immediately upstream of the valve 58 is at the approximate PH of the electrolyte and/or when the PH of the solution in that line is at approximately the PH of the stand-by solution, whereby changing the cell to and from its operating and stand-by modes is effected by selectively manually setting the device 61 to one of its two set positions.

It is to be noted that in the preferred carrying out of my invention, the pump operates continuously when the system is in its operating mode whereby the electrolyte serves to carry away heat generated by the chemical reaction in the cells and to thereby maintain the battery at an efficient operating temperature.

In practice, the chemical balance and/or the PH of the electrolyte in the tank 50 must be maintained at a predetermined level at all times to assure most effective operation of the cell, when the cell is put into its operating mode.

To maintain desired PH balance in the electrolyte, I provide a supply tank 63 of liquid base concentrate and a supply tank 64 of liquid acid concentrate, above the tank 50. Delivery lines 65 and 66 extend from the tanks 63 and 64 to the tank 50 and electrically operated on and off valves 67 and 68 are arranged in the lines 65 and 66. I next provide a PH detector 69 in the tank 50 and an electric control unit 70 connected with and between the valves 67 and 68 and the detector 69. The control unit 70 is such that when the PH of the electrolyte in the tank 50 is high and above the desired PH, the valve 67 is opened to add base concentrate into the tank to thereby lower the PH of the electrolyte; and is such that when the PH of the electrolyte in the tank is low or below the desired PH, the valve 68 is opened to effect the addition of acid concentrate into the tank and to thereby elevate the PH of the electrolyte, as circumstances require.

In practice, the chemical balance and/or PH of the stand-by solution in the tank 51 should be maintained within a predetermined range. The effective PH range of the stand-by solution is rather great and is such that it is questionable that relating the tank 51 with the base and acid concentration supply tanks 63 and 64, in the manner that the tank 50 is related to those concentrate supply tanks, would be practically and/or economically justifiable. It is believed to be sufficient to simply provide the tank 51 with a PH detector 71 and related meter 72 whereby the PH of the stand-by solution can be visually monitored and to provide that tank with a normally closed access opening 73 to facilitate manually introducing base or acid concentrates to the solution in the tank as circumstances require.

It is to be understood and will be readily apparent that if desired and/or if circumstances require, lines similar to the lines 65 and 66, valves similar to the valves 67 and 68 and a control unit similar to the control unit 70 related with and between the tanks 50, 63 and 64 and with the detector 69, can be related with and between the tanks 51, 63 and 64 and with the detector 71, without departing from the spirit of the present invention.

In addition to the means E, the system and/or apparatus that I provide includes an air and/or oxygen supply means to supply air or oxygen, at desired predetermined pressure to the chambers Y of the cell C to act on and with the cathode plate 11 and the diaphragm 14 of the cell C.

The means O includes a suitable high pressure air supply D and an elongate (sectional) air supply line 75 extending from the supply D and connected with the line or lines 35 of the means M of the cell C. The supply line 75 has a pressure regulator 76 therein to limit and control the pressure of the air delivered into the chambers Y of the cell C.

In addition to the above, a branch line 75' extends from the line 75 to the tank 50 of the means E and has a pressure regulator 77 engaged therein to limit the pressure in the tank 50 and on the electrolyte in the system to a pressure below the pressure of the air in the system.

A manifold 75" connects with the line 75' downstream of the regulator 77 and extends to and connects with the several tanks 51, 63 and 64 of the means E, whereby the pressure in and throughout the whole of the means E is suitably balanced and uniform.

In the form of the invention illustrated, the air supply D includes an air storage tank 80 supplied with air by a power driven pump P', which pump is under control of a pressure actuated switch 81, in accordance with common practice.

In the preferred form of the invention illustrated in FIG. 5 of the drawings, the means O includes oxygen generating means G connected with and between sections of the line 75, between the pressure regulator 76 and the cell C or the line 35 of the means M thereof. The means G includes a holding tank 85 containing a supply of hydrogen peroxide. The tank 85 is pressurized by air delivered to it by the section of the line 57 downstream of the pressure regulator 76. The means G next includes a generator tank 86 with a high surface, porous metal catalyst 87 arranged therein. A transfer line 88 extends from the tank 85 to the tank 86 and conducts hydrogen peroxide from the tank 85 into the tank 86 where it contacts the catalyst 87. When the hydrogen peroxide contacts the catalyst, it decomposes and generates oxygen and water. The water drops to the bottom of the tank 86 and is periodically drained therefrom by means of a suitable valve control drain 89. The oxygen generated in the tank is conducted from that tank to the cell C through a related downstream section of the line 75 and the line or lines 35 of the means M of the cell.

A check valve 91 is provided in the line 88, The valve 91 closes and stops the flow of hydrogen peroxide into the tank 86 and prevents the back-flow of oxygen through the line 88 and into the tank 85 when the pressure of the oxygen generated in the tank 86 is equal or greater than the pressure in the tank 85, as determined by the pressure regulator 76.

The generating means G next includes a return line 92 extending from the tank 86 back to the section of the line 75 upstream of the pressure regulators 76 and 77, a normally closed pneumatically operated valve 93 in the line 92 and a normally open pneumatically operated valve 94 and in the line 75 upstream of the pressure regulators 76 and 77. The pneumatic actuators of the valves 73 and 74 are suitably connected with the tank 86 and are set to operate from their normal positions to their actuated positions when the pressure in the tank 86 is slightly greater than the set pressure of the regulator 76.

Finally, the means G includes a pressure relief valve at the tank 86, which valve opens when and if the pressure in the tank 86 and communicating with the cell C exceeds the maximum pressure of the operating pressure range of the cell.

With the above relationship of parts, it will be apparent that when the system is operating the generating means G generates sufficient oxygen at sufficient pressure to maintain the entire system operating and that the air supply D can be and is put out of operation and on stand-by.

In accordance with the above, in the form of the invention illustrated, the air supply means D is only required and is only put into use when it is desired to quickly put the system into operation.

In practice, if time permits, the system can be put into operation by simply introducing hydrogen peroxide into the tank 86 and waiting for the hydrogen peroxide to react with the catalyst 87 in the tank and to generate oxygen and to bring the system up to operating pressure. In such a case, the means D can be eliminated.

In operation of the invention described in the foregoing, the pressure of the oxygen is normally from 1 to 5 psi higher than the pressure of or on the electrolyte and on the stand-by solution, so that a pressure differential is maintained across the cathode plate or plates 11. The noted pressure differential induces the feeding of the oxygen into and through the cathode plate or plates at a certain and desired rate. Further, the noted pressure differential impedes the movement or flow of the electrolyte and/or the stand-by solution from the chamber or chambers X through the plate or plates 11 and into the chamber or chambers Y.

In addition to the above, the higher pressure of the oxygen establishes a differential in pressure across the diaphragm and anode plate assembly or assemblies which differential in pressure urges and moves the assembly or assemblies toward their related collector or collectors 12 whereby the anode plate or plates are held in uniform supported engagement with and against their related collectors. With this relationship of parts, as the anode plate or plates are consumed and dimensionally reduced in thickness, the distance between the anode and cathode plates remains constant whereby the rate of consumption and/or reduction of the anode plate or plates is substantially uniform throughout their entire planes.

Still further, with the foregoing combination and relationship of parts, the material of which each anode plate is established is held in place between its related diaphragm 14 and collector 12 when and as the plate is reduced by chemical reaction and so that it is effectively held in place until it is entirely consumed and throughout that period when insufficient material remains to maintain the plate integrated or in one piece.

In practice, the cell C' can be supplied with air, rather than with oxygen. In such a case, as shown in FIG. 7 of the drawings, the means O' does not include the above noted oxygen generating means and the air supply D' is utilized to supply air, under control of pressure regulators 76' and 77' to the cell C' and to the means E' of the system.

When air is supplied to the cell C', as noted above, carbon dioxide must be removed from the air delivered to the cell to maintain proper functioning of the cell. To this end, the means O' is provided with an air scrubber 100 containing an aqeuous solution of potassium hydroxide, through which the air is conducted and which operates to remove carbon dioxide therefrom.

In this last form of my invention, the means O' and M' are such that air is delivered to the cell C' and continuously and is exhausted to atmosphere through a valve 101 whereby a fresh supply of air is maintained in the cell at all times to practice the invention. Accordingly, I will not burden this disclosure with further detailed description of the means O'.

Having described only typical preferred forms and applications of my invention, I do not wish to be limited to the specific details herein set forth but wish to reserve to myself any modifications and/or variations that may appear to those skilled in the art and which fall within the scope of the following claims:

Having described my invention, I claim:

1. An air/metal fuel cell comprising an anode plate of metallic fuel having flat, inner and outer surfaces, a cathode plate of micro-porous electro catalytic materials, an elongate case with outer ends and defining an interior space, said anode plate is arranged transverse said interior space between the ends thereof and is shiftable axially therein, said cathode plate is mounted in the case to extend transverse said interior space in fixed position between the ends of the case with its outer surface spaced from one end of the case and defining a first air chamber and with its inner surface opposing the inner surface of the anode plate and defining an electrolyte chamber, a positive electric terminal extending through the case with an outer end and projecting from the case and an inner end connected with the cathode plate, an electric collector in the electrolyte chamber and a dielectric insulator through which electrolyte is free to flow positioned between the collector and the cathode maintaining the inner opposing surfaces of the plates in predetermined spaced relationship, a negative electric terminal extending through the case with an outer end projecting from the case and an inner end connected with the collector, a flexible diaphragm mounted in the case and extending transverse the interior space in spaced relationship from the other end of the case and defining a second air chamber and engaging the outer surface of the anode plate, electrolyte supply means connected with the case and conducting liquid eletrolyte into the electrolyte chamber at predetermined pressure, air supply means connected with the case and conducting air at greater pressure than the pressure on the electrolyte into said first air chamber to supply oxygen to the cathode plate and into said second chamber to urge the diaphragm and anode plate axially toward the collector and the cathode plate.

2. The cell structure set forth in claim 1 wherein the case has a lateral opening communicating with the interior space and through which the anode plate can be moved and a removable closure normally closing said lateral opening.

3. The cell set forth in claim 1 wherein the electrolyte supply means includes a liquid electrolyte supply, a non-chemically reactive stand-by solution supply, pump means to move the electrolyte and the solution, liquid conductors extending between and connected with the electrolyte chamber and the pump means and between the pump means and the electrolyte supply and the solution supply and valves in the conductors operable to selectively conduct the electrolyte between the electrolyte chamber and electrolyte supply and the solution between the electrolyte chamber and the solution supply whereby the electrolyte is selectively moved into the electrolyte chamber to displace the solution and to fill the chamber and the solution can be selectively moved into the electrolyte chamber to displace the electrolyte and to fill the chamber.

4. The cell structure set forth in claim 3 wherein the case has a lateral opening communicating with the interior space and through which the anode plate can be moved and a removable closure normally closing said lateral opening.

5. The cell set forth in claim 3 wherein the air supply means includes oxygen generating means comprising an oxygen generator tank, a metalic catalyst in the tank, an oxygen delivery line from the tank to the air chambers, a hydrogen peroxide supply and hydrogen peroxide delivery line conducting hydrogen peroxide from the hydrogen peroxide supply into the tank and to the metal catalyst therein and a pressure relief valve communicating with the tank.

6. The cell set forth in claim 1 wherein the air supply means includes oxygen generating means comprising an oxygen generator tank, a metallic catalyst in the tank, an oxygen delivery line from the tank to the air chambers, a hydrogen peroxide supply and hydrogen peroxide delivery line conducting hydrogen peroxide from the hydrogen peroxide supply into the tank and to the metal catalyst therein and a pressure relief valve communicating with the tank.

* * * * *